US011235880B2

(12) United States Patent
Ozaki et al.

(10) Patent No.: US 11,235,880 B2
(45) Date of Patent: Feb. 1, 2022

(54) REAR SIDE SHELL STRUCTURE AND SEAT UNIT

(71) Applicant: JAMCO CORPORATION, Mitaka (JP)

(72) Inventors: Masaji Ozaki, Mitaka (JP); Michihito Suzuki, Mitaka (JP)

(73) Assignee: JAMCO CORPORATION, Mitaka (JP)

( * ) Notice: Subject to any disclaimer, the term of this patent is extended or adjusted under 35 U.S.C. 154(b) by 218 days.

(21) Appl. No.: 16/500,202

(22) PCT Filed: Dec. 18, 2017

(86) PCT No.: PCT/JP2017/045276
§ 371 (c)(1),
(2) Date: Oct. 2, 2019

(87) PCT Pub. No.: WO2018/185980
PCT Pub. Date: Oct. 11, 2018

(65) Prior Publication Data
US 2021/0101685 A1 Apr. 8, 2021

(30) Foreign Application Priority Data

Apr. 3, 2017 (JP) .............................. JP2017-073605

(51) Int. Cl.
*B64D 11/06* (2006.01)
*B64D 11/00* (2006.01)

(52) U.S. Cl.
CPC ...... *B64D 11/0649* (2014.12); *B64D 11/0648* (2014.12); *B64D 11/0015* (2013.01)

(58) Field of Classification Search
CPC ........ B64D 2011/0046; B64D 11/0602; B64D 11/0606; B64D 11/0648
See application file for complete search history.

(56) References Cited

U.S. PATENT DOCUMENTS 4,898,426 A 2/1990 Schulz et al.
2007/0246981 A1* 10/2007 Plant .................... B64D 11/064
297/248
(Continued)

FOREIGN PATENT DOCUMENTS

CN 105564283 A 5/2016
FR 3076261 A1 * 7/2019 ............... B60N 2/24
(Continued)

OTHER PUBLICATIONS

International Search Report dated Mar. 13, 2018, issued in counterpart International Application No. PCT/JP2017/045276, with English Translation. (6 pages).
(Continued)

*Primary Examiner* — Timothy J Brindley
(74) *Attorney, Agent, or Firm* — Westerman, Hattori, Daniels & Adrian, LLP (57) ABSTRACT

The invention provides a rear side shell structure in the form of a back covering that can be attached to a lower structure of a seat without support legs. One representative rear side shell structure and seat unit according to the invention relates to a rear side shell structure for covering a back of a seat, the rear side shell structure including a front surface member and a rear surface member, wherein a reinforcing region in which a space reinforcing member is provided between the front surface member and the rear surface member is provided in a portion of the rear side shell structure, and the front surface member and the rear surface member are directly joined to each other except for in the reinforcement region. Further, the front surface member and the rear surface member are formed of composite members. Also, the space reinforcing member has a honeycomb structure.

16 Claims, 13 Drawing Sheets

(56) References Cited

U.S. PATENT DOCUMENTS

| | | |
|---|---|---|
| 2007/0267543 A1 | 11/2007 | Boren et al. |
| 2008/0290715 A1 | 11/2008 | Fullerton et al. |
| 2009/0065643 A1 | 3/2009 | Park |
| 2011/0101165 A1 | 5/2011 | Fullerton et al. |
| 2011/0278901 A1 | 11/2011 | Fujita et al. |
| 2012/0138744 A1 | 6/2012 | Fullerton et al. |
| 2016/0214518 A1 | 7/2016 | Ter Steeg et al. |

FOREIGN PATENT DOCUMENTS

| | | | |
|---|---|---|---|
| JP | 58-173355 U | 11/1983 | |
| JP | 58-173360 U | 11/1983 | |
| JP | 1-306395 A | 12/1989 | |
| JP | 3-61529 A | 3/1991 | |
| JP | 2008-521703 A | 6/2008 | |
| JP | 2009-154821 A | 7/2009 | |
| JP | 2009-537383 A | 10/2009 | |
| JP | 2010-527835 A | 8/2010 | |
| JP | 2014-516859 A | 7/2014 | |
| WO | WO-9206003 A1 * | 4/1992 | ............. B64D 11/06 |
| WO | 2012/169906 A1 | 12/2012 | |
| WO | 2015/032752 A2 | 3/2015 | |
| WO | WO-2016164299 A1 * | 10/2016 | ............. B61D 33/00 |
| WO | WO-2018185978 A1 * | 10/2018 | ......... B64D 11/0606 |
| WO | WO-2018185979 A1 * | 10/2018 | ......... B64D 11/0601 |
| WO | WO-2018185980 A1 * | 10/2018 | ............. B64D 11/06 |
| WO | WO-2019216927 A1 * | 11/2019 | ......... B64D 11/0606 |
| WO | WO-2021083778 A1 * | 5/2021 | ......... B64D 11/0602 |

OTHER PUBLICATIONS

Written Opinion of the International Searching Authority (Form PCT/ISA/237) dated Mar. 13, 2018, issued in counterpart International Application No. PCT/JP2017/045276 (4 pages).

Extended European Search Report dated Nov. 12, 2020, issued in counterpart EP Patent Application No. 17904740.2 (12 pages).

* cited by examiner

REAR SIDE SHELL STRUCTURE AND SEAT UNIT

TECHNICAL FIELD

The present invention relates to a rear side shell structure and a seat unit using the same.

BACKGROUND ART

In recent aircraft design, there are demands to reduce the weight of aircraft structures and to simplify the installation of aircraft equipment such as seat units. If weight reduction of the aircraft structure can be achieved, the number of passengers that can be carried by the aircraft can be increased accordingly, and the potential profitability of the aircraft can be increased.

In addition, if installation of aircraft equipment can be simplified, the time required for aircraft manufacture can be shortened, and at the same time, the manufacturing cost can be reduced.

In Patent Document 1, there is described a seat assembly comprising an integral composite frame and a comfort frame assembly provided for each passenger that is connected to the composite frame.

In the composite structure frame, a support leg connected to an aircraft airframe, a back support element connected to the support leg, as well as an upper back cross beam and a lower back cross beam connected to the back support element are integrally formed.

Between the upper back cross beam and the lower back cross beam, an opening is provided for accommodating a tray table for use by a rear passenger.

CITATION LIST

Patent Literature

[Patent Document 1] Japanese Translation of PCT International Application Publication No. 2010-527835

SUMMARY OF INVENTION

Technical Problem

An object of the present invention is to provide a rear side shell structure in the form of a back covering that can be attached to a lower structure of a seat without support legs.

Solution to Problem

In order to achieve the above-described object, one representative rear side shell structure and seat unit according to the present invention relates to a rear side shell structure for covering a back of a seat, the rear side shell structure including a front surface member and a rear surface member, wherein a region (hereinafter referred to as a "reinforcing region") in which a space reinforcing member is provided between the front surface member and the rear surface member is provided in a portion of the rear side shell structure, and the front surface member and the rear surface member are directly joined to each other except for in the reinforcement region.

Advantageous Effects of Invention

According to the present invention, it is possible to realize a rear side shell structure that increases the strength of the aircraft against strong impacts from the longitudinal direction and the lower surface direction.

DESCRIPTION OF EMBODIMENT(S)

Figure 1:
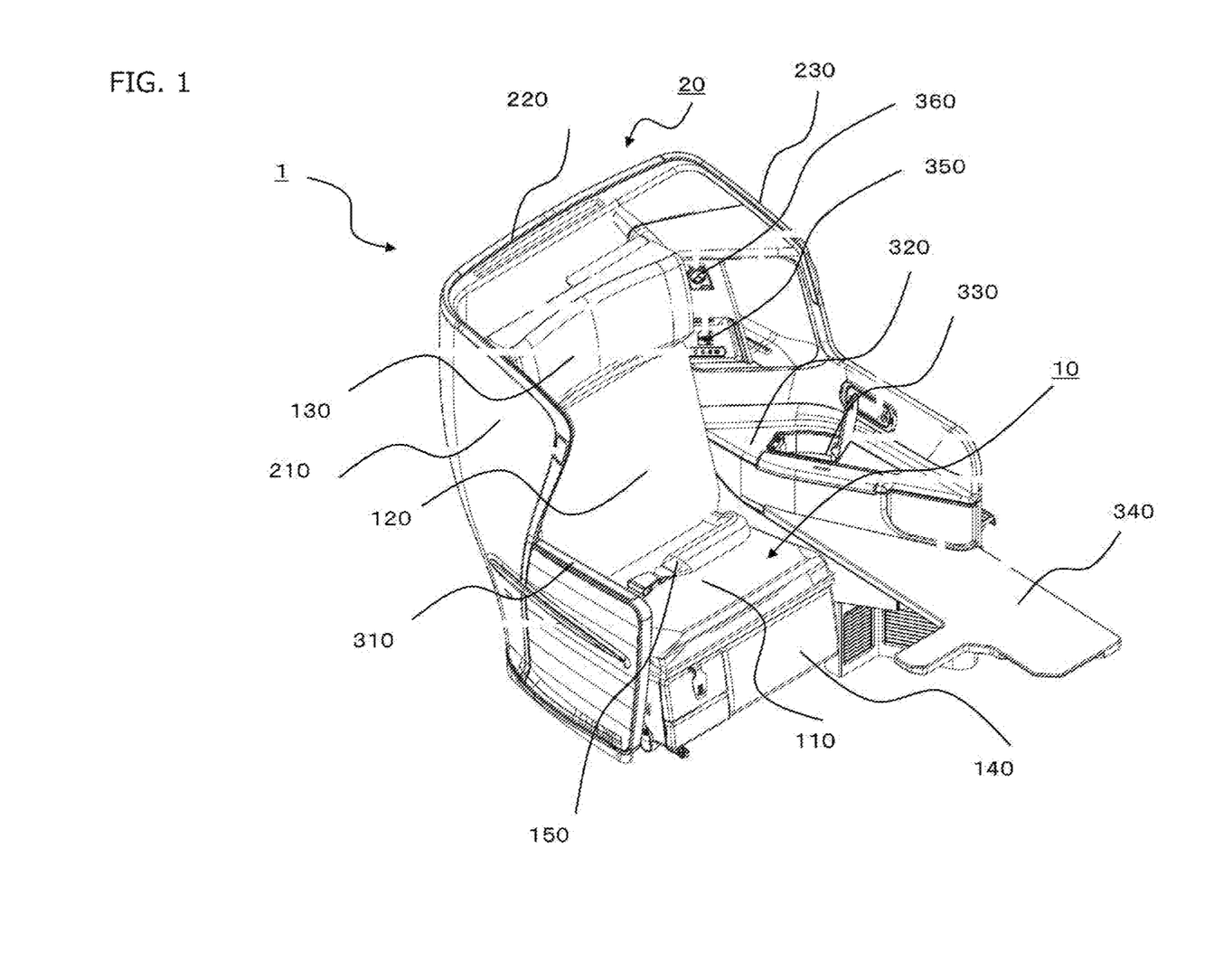
FIG. 1 is a front perspective view of a general seat unit.

First, a general seat unit will be described. FIG. 1 is a perspective view of a seat unit for business class or first class that is disposed in the cabin of an aircraft, as viewed from the forward direction. The seat unit 1 has a structure in which the seat 10 is surrounded by a shell 20, and in this Figure, equipment used by a passenger (such as a reading light 360) is also depicted.

The seat 10 includes a lower seat 110, an upper seat 120, a headrest 130, and a leg rest 140. The lower seat 110 is also referred to as a seating portion, and the upper seat 120 is also referred to as a backrest. A seat belt 150 is attached to the seat.

The shell 20 includes a right side shell 210 on the right side of the seat 10, a rear side shell 220 on the rear side of the seat 10, and a left side shell 230 on the left side of the seat 10.

The seat unit 1 further includes various equipment. On the right side of the seat 10, a right armrest portion 310 is provided. On the left side of the seat 10, a left armrest portion 320 is provided. The left armrest portion 320 is provided with an openable/closable storage box 330. An ottoman 340 is disposed in front of the left armrest portion 320.

Further, between the headrest 130 and the left side shell 230, one or more jacks 350 for electronic devices and a reading light 360 are disposed.

First Embodiment

Figure 2:
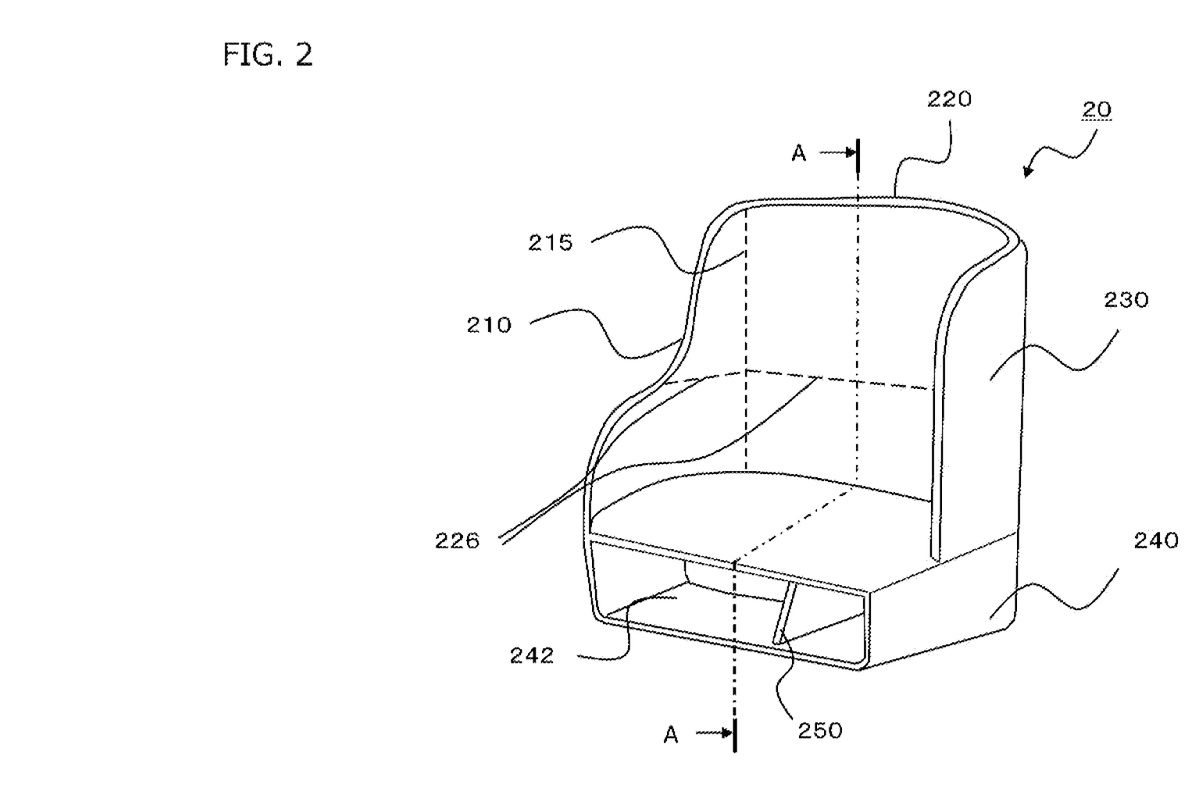
FIG. 2 is a front perspective view of a shell structure that includes the rear side shell structure according to the first embodiment.

FIG. 2 is a front perspective view of a shell structure that includes the rear side shell structure according to the first embodiment.

Overall Configuration

In FIG. 2, the shell 20 is constituted by a seat base 240 which serves as the lower structure of the seat unit and an upper shell present thereon. Also, the upper shell is constituted by a right side shell 210, a rear side shell 220 that covers the entire rear side, and a left side shell 230.

The seat base 240, which serves as the lower structure of the seat unit, is formed in a hollow box shape using integrally formed members. Here, specifically, the integrally formed members are members formed from thermoplastic resins such as polyetherimide or polyetherketoneketone, thermosetting resins capable of appropriately controlling flammability, or composite materials such as carbon graphite fiber, glass fiber, or aramid fiber, and are composite members that contain a core material such as foam or honeycomb. The upper shell is also formed of similar composite members.

Such an integrally formed composite member can form a solid three-dimensional shape without using connection parts such as bolts and nuts. Furthermore, since the integrally formed composite member is formed from the above-described composite materials, the locations that perform anticorrosion processes can be significantly reduced in comparison with the structural members formed from conventional metals.

In addition, the hollow box structure has what is known as a monocoque structure. Accordingly, the seat base 240 can support the load of the seat, the passenger, and the equipment used by the passenger (such as the reading light 360).

The hollow region 242 of the seat base 240 is rectangular when viewed from the front of the seat, but may have a quadrilateral shape, such as a trapezoid. In addition, the thickness of the seat base 240, that is, the thickness of the members constituting the lower structure of the seat, are approximately 10 mm to 15 mm.

With such a seat base 240, since is no concept of a column-like support or leg portion for supporting the leg of one seat, the seat base 240 is not restricted by the position of the seat track on the airframe side. In addition, regardless of the shape of the upper structure of the seat, a common structure can be adopted for seats of various sizes and shapes. Further, since the installation of electric devices and the arrangement of the wiring associated therewith are not restricted by the position of the leg portion, the degree of freedom and commonality in design can be expanded.

In addition, a partition member 250 can be disposed in the hollow region 242. Since the seat base 240 has a hollow monocoque structure, the partition member 250 (sometimes referred to as a partition plate) need not support the load of a passenger or the like, and can freely move within the hollow region 242.

(Configuration of the Rear Side Shell Structure)

In FIG. 2, below the rear side shell 220, which is a rear side shell structure for covering the back of the seat, a space reinforcing member is provided between the front surface member and the rear surface member that constitute the shell. The region where the space reinforcing member is provided is referred to as a reinforcing region. In the following, a honeycomb structure will be described as an example of a space reinforcing member. Also, above the rear surface side shell 220, the honeycomb structure is not provided between the front surface member and the rear surface member, and the front surface member and the rear surface member are directly joined. That is, the region above the rear side shell 220 is a region other than the reinforcing region. The material of the front surface member and the rear surface members is, for example, a composite fiber of resin and fiber. In addition, the material of the honeycomb structure is, for example, a composite fiber made of noncombustible paper and phenolic resin.

In FIG. 2, a dotted line is drawn as a structural branch line 226 in the central portion of the rear side shell 220, but this is for the sake of convenience to illustrate the boundary of the region having the honeycomb structure (that is, the reinforcing region) and the region that does not have the honeycomb structure (that is, the region other than the reinforcing region) between the front surface member and the rear surface member that constitute the shell.

In addition, in FIG. 2, a shell boundary line 215 is drawn between the right side shell 210 and the rear side shell 220 for the sake of convenience. Similarly to the rear side shell 220, the right side shell 210 may include a honeycomb structure between the front surface member and the rear surface member constituting the shell in the region below the structural branch line 226, or in the right side shell 210, the region having the honeycomb structure may be appropriately modified independently of the structural branch line 226. If not needed, the right side shell 210 may not include the honeycomb structure. In the region which does not include the honeycomb structure, it is desirable for the front surface member and the rear surface member which constitute the shell to be directly joined.

The left side shell 230 also has a configuration similar to that of the right side shell 210 described above. It should be noted that in FIG. 2, the front of the left side shell 230 does not extend to the front of the seat base 240, but similarly to the right side shell 210, the left side shell 230 may extend to the front of the seat base 240.

(Configuration of the Seat)

Figure 3:
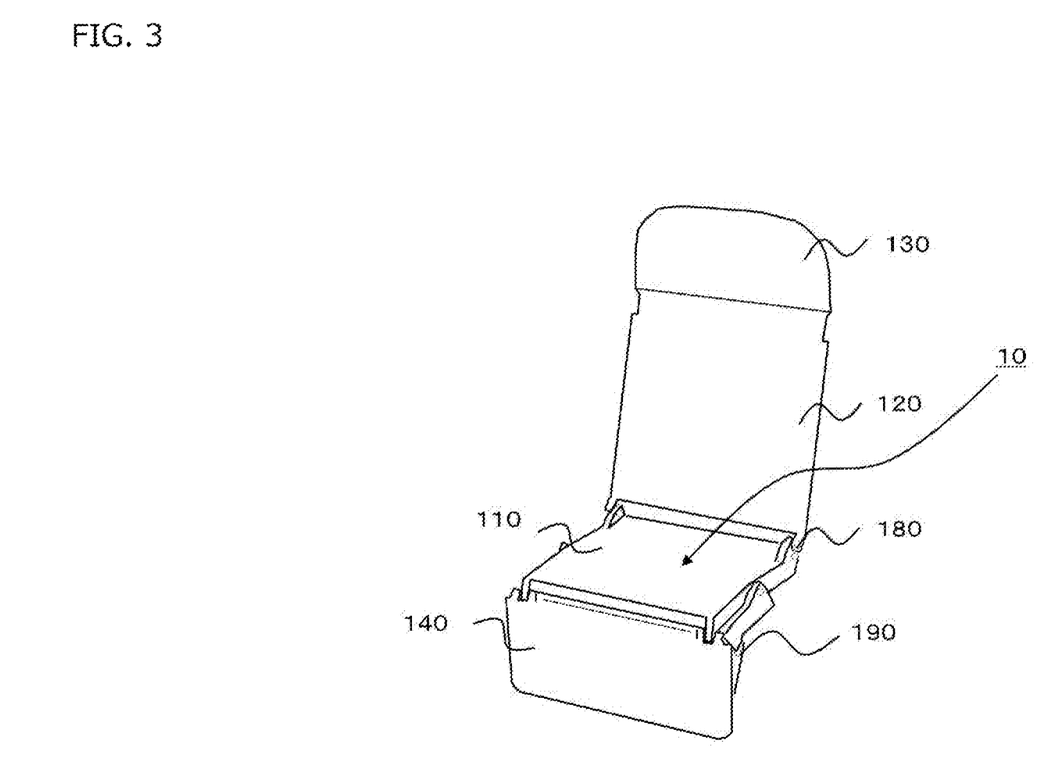
FIG. 3 is a front perspective view of a seat.

FIG. 3 is a perspective view of an example of a seat used in the first embodiment as viewed obliquely from the front. The seat 10 includes a lower seat 110 on which a passenger sits, an upper seat 120 to serve as a backrest, a headrest 130 that is a pillow-like portion on the upper part of the backrest and allows passengers to rest their head and neck, and a leg rest 140 for passengers to rest their legs and reduce fatigue on their calves or the like.

The seat reclining mechanism 180 is a mechanism that tilts the upper seat 120 rearward. The foot reclining mechanism 190 is a mechanism that rotates the leg rest 140 so as to lift it toward the surface of the lower seat 110.

(Configuration of the Seat Unit)

Figure 4:
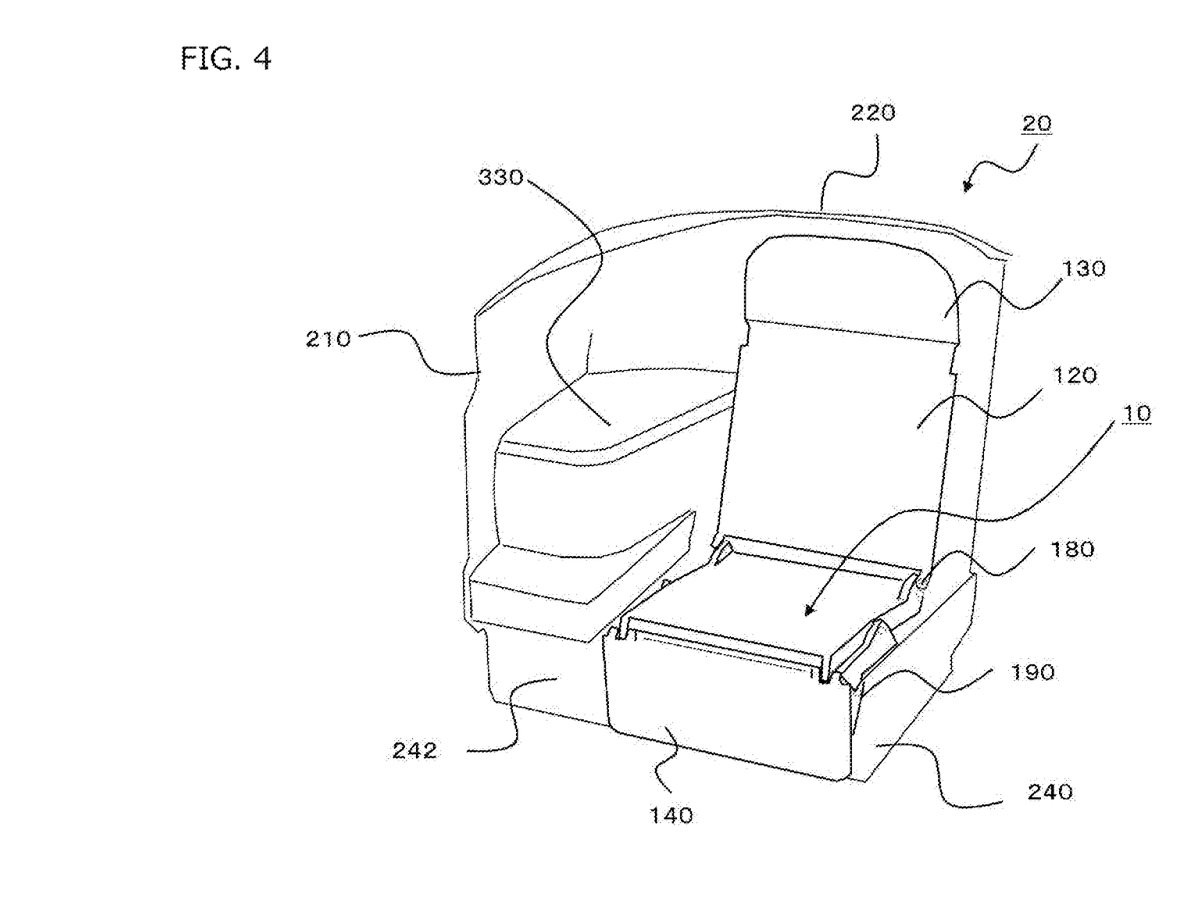
FIG. 4 is a front perspective view of a seat unit.

FIG. 4 is a perspective view of a seat unit utilizing the rear side shell structure according to the first embodiment as viewed obliquely from the front. The seat unit 1 has a configuration in which the seat 10 described with reference to FIG. 3 is placed on the shell 20 described with reference to FIG. 2. In addition, a storage box 330 that serves as both a console and a leg space for the rear seat is disposed between the seat 10 and the right side shell 210.

Figure 5:
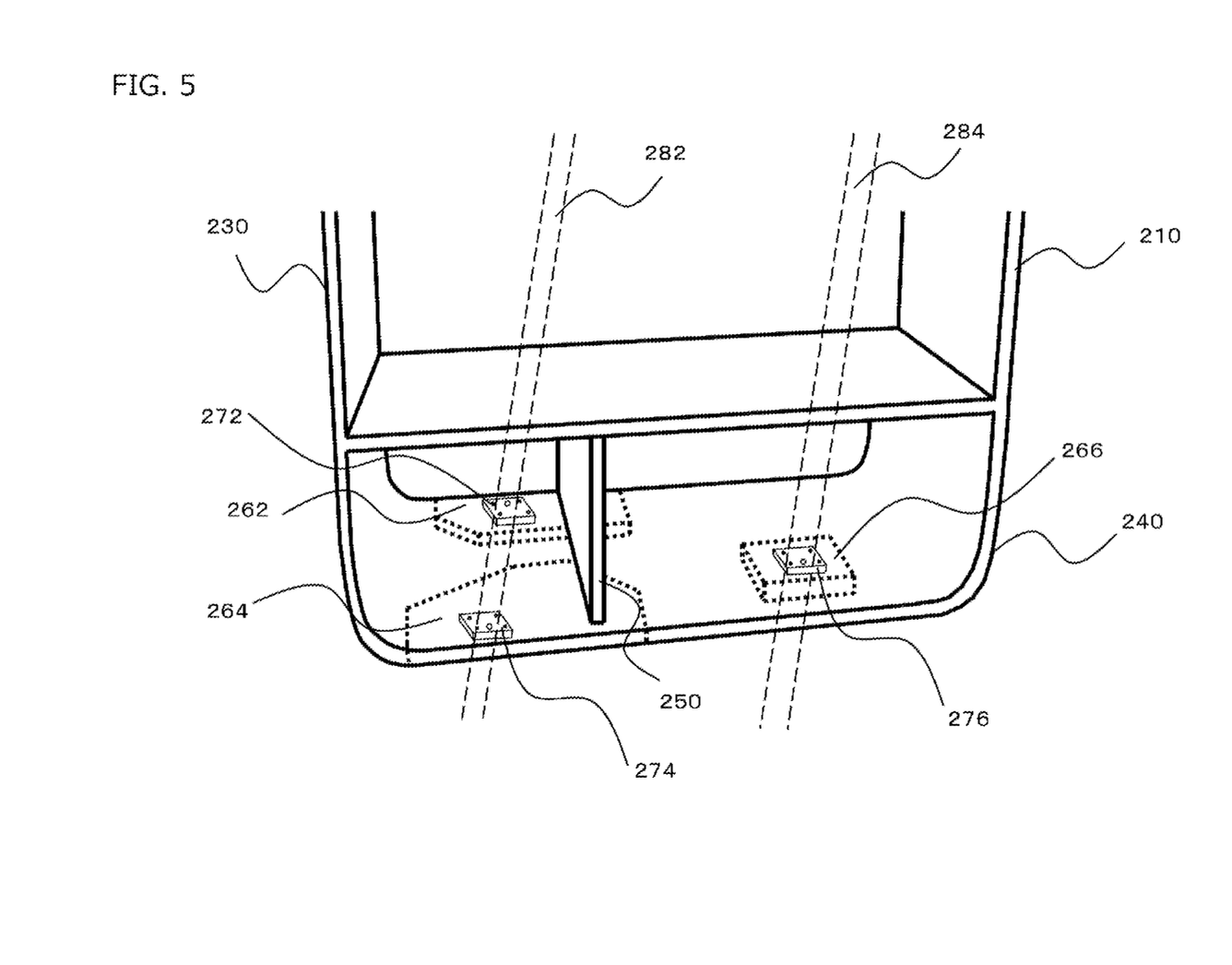
FIG. 5 is a rear perspective view of a seat base.

FIG. 5 is a perspective view of the lower structure (seat base) of the seat unit as viewed obliquely from the rear. The shell 20 omits the rear side shell 220 for convenience of describing the seat track to be described later, and only the right side shell 210 and the left side shell 230 are illustrated in the Figures.

The first seat track 282 and the second seat track 284 constitute a pair of seat tracks and extend on the floor in the longitudinal direction of the aircraft airframe. In the aircraft, by fixing the bottom of the seat unit 1 (the bottom of the seat base 240 in FIG. 5) to the pair of seat tracks, the seat unit 1 is attached to the aircraft airframe. To ensure passenger safety, it is necessary for this seat unit 1 to pass a predetermined dynamic load test. In FIG. 5, the seat base 240 is disposed slightly leftward with respect to the longitudinal direction of the aircraft airframe. For this reason, the seat base 240 does not squarely face the first seat track 282 and the second seat track 284, but faces slightly to the left.

At the bottom of the seat base 240, three mounting blocks are inserted (the mounting blocks are shown with dotted lines). The seat base 240 is secured to the three fixtures for attachment to the aircraft airframe via the three mounting blocks. Since the seat base 240 has a monocoque structure, mounting blocks are provided at the bottom of the seat base 240 and are used to reinforce the connection between the fixture and the seat base 240. The material of the mounting block is preferably made of metal or the like, but the material is not limited as long as it is a reinforcing block.

In FIG. 5, in order to attach the seat base 240 to the aircraft airframe in three locations, the first mounting block 262 is arranged in front of the bottom of the seat base 240 and the second mounting block 264 is arranged behind it. The third mounting block 266 is arranged on the right side.

Below each mounting block, the fixtures for the seat track are respectively arranged (the fixtures are indicated by solid lines). That is, a first fixture 272 is disposed below the first mounting block 262 and is attached to the first seat track 282. A second fixture 274 is disposed below the second mounting block 264 and is mounted to the first seat track 282 at a point separated from the first fixture 272.

In addition, a third fixture 276 is disposed below the third mounting block 266 and is attached to the second seat track 284 at a corresponding location between the first fixture 272 and the second fixture 274. Preferably, the third fixture 276 is mounted approximately at the center of a corresponding location between the first fixture 272 and the second fixture 274.

In this way, using the three fixtures to secure the seat base 240 to the pair of seat tracks eliminates the need for mounting the seat base 240 at an orientation that squarely faces the seat tracks. This makes it possible to significantly improve the degree of freedom in mounting the seat with respect to deviations of the airframe, as well as the compliance required at the time of seat certification with respect to floor surface deformations.

(Cross-Sectional Configuration of Rear Side Shell Structure)

Figure 6:
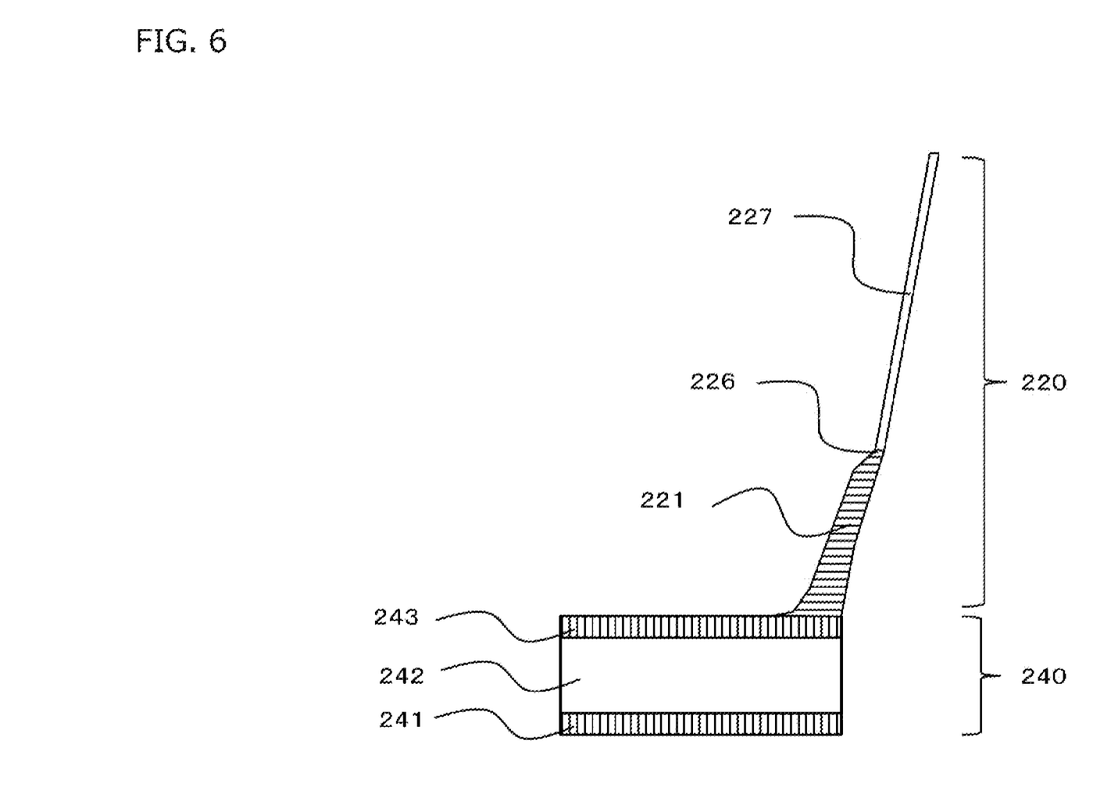
FIG. 6 is a cross-sectional view of a shell structure according to the first embodiment.

FIG. 6 is a cross-sectional view of the shell structure according to the first embodiment taken along the line A-A of FIG. 2. The seat base 240 is constituted by a bottom 241 and a top 243 that cover the top and bottom of the hollow area 242, and the bottom 241 and the top 243 are depicted as having a honeycomb structure.

In addition, with regard to the rear side shell 220 that serves as the rear side shell structure, the lower portion 221 below the structural branch line 226 has a honeycomb structure, but the upper portion 227 above the structural branch line 226 is illustrated as having a honeycomb structure. In the example of FIG. 6, the structural branch line 226 is approximately at the center of the rear side shell 220. Also, such a cross-sectional structure is provided over the entire lateral width of the rear side shell 220.

Figure 7:
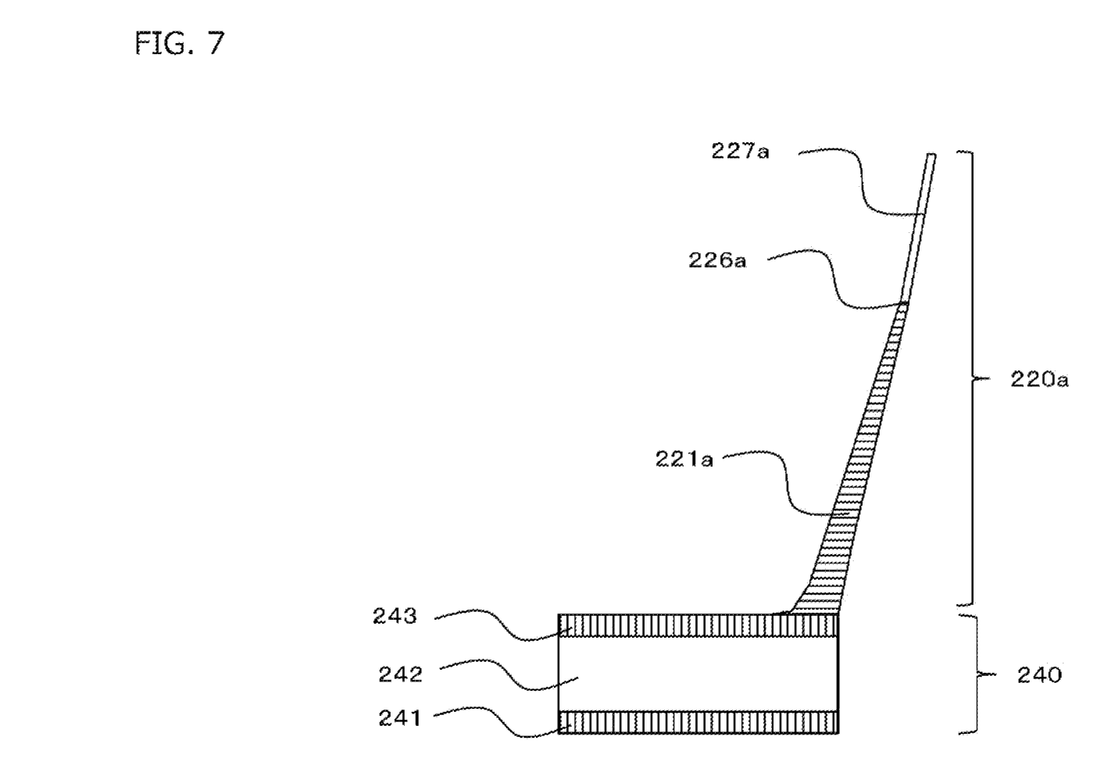
FIG. 7 is a cross-sectional view of a shell structure according to the first embodiment (Modified Example 1).

FIG. 7 is a cross-sectional view of a Modified Example 1 of the first embodiment illustrated in FIG. 6. The difference from the case of FIG. 6 is that the position of the structural branch line 226a is higher, and is approximately one-fourth from the top of the rear side shell 220a. Accordingly, the lower portion 221a corresponds to the entire back of the passenger from the waist to the shoulders, and the upper portion 227a corresponds to the head of the passenger.

Figure 8:
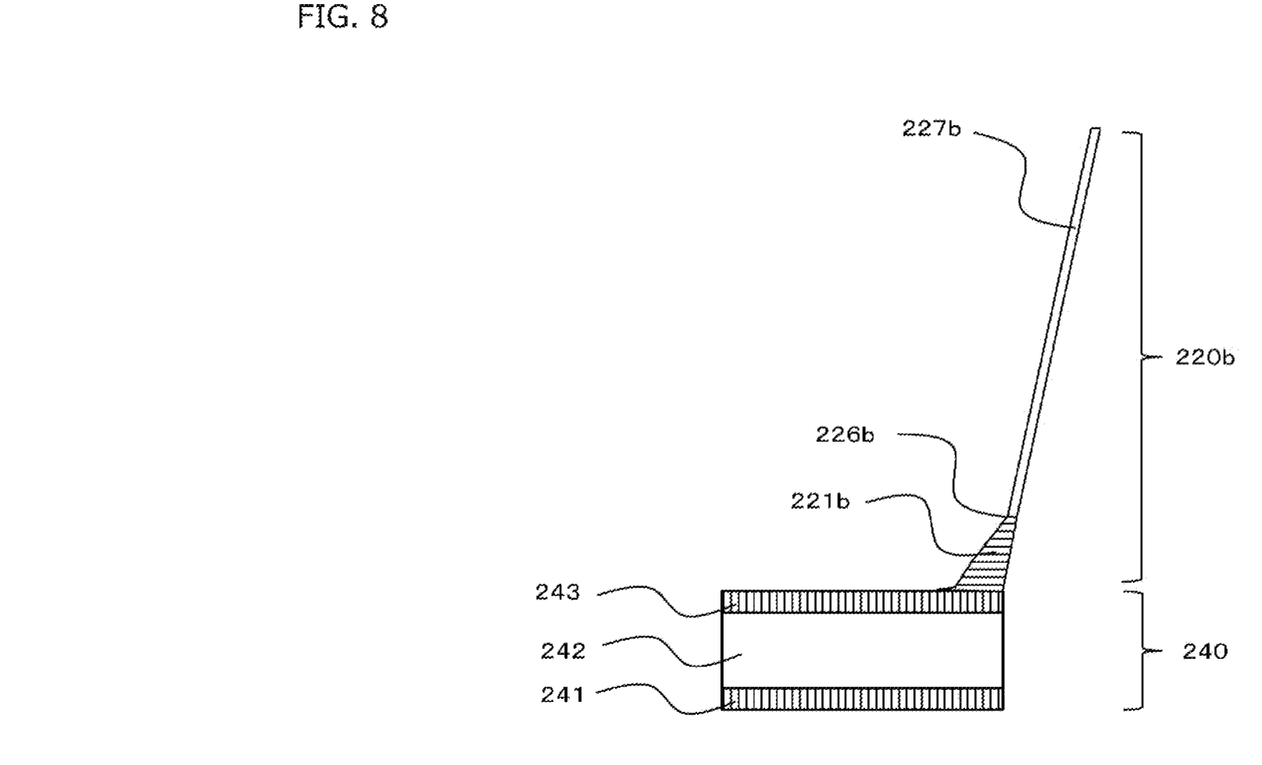
FIG. 8 is a cross-sectional view of a shell structure according to the first embodiment (Modified Example 2).

FIG. 8 is a cross-sectional view of a Modified Example 2 of the first embodiment illustrated in FIG. 6. The difference from FIG. 6 is that the position of the structural branch line 226b is lower, and is approximately one-fourth from the bottom of the rear side shell 220b. Accordingly, the lower portion 221b corresponds to the waist of the passenger, and the upper portion 227b corresponds to the area from the chest to the head of the passenger.

That is, in the rear side shell structure, the region having the honeycomb structure can be appropriately selected based on a consideration of the strength required for the shell, the cost required for manufacturing, and the like.

Figure 9:
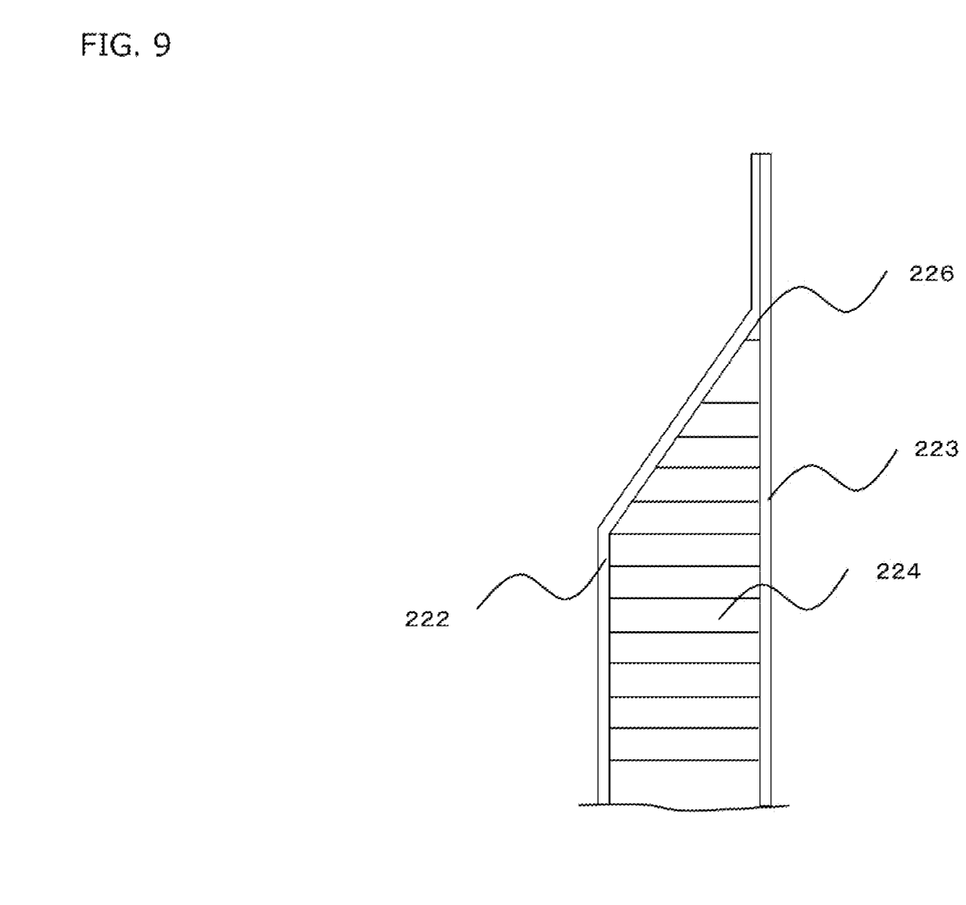
FIG. 9 is an enlarged cross-sectional view of a tapered portion of the shell structure according to the first embodiment.

FIG. 9 is an enlarged cross-sectional view of a region (hereinafter referred to as a "tapered portion") in the vicinity where the front surface member and the rear surface member that constitute the shell of the rear side shell structure according to the first embodiment are in proximity to each other, and is an enlarged view around the structural branch line 226 of FIG. 6. As described above, the front surface member 222 and the rear surface member 223 that constitute the shell sandwich the honeycomb structure 224 below the rear surface side shell 220. As the front surface member 222 approaches the structural branch line 226, the interval between the front surface member 222 and the rear surface member 223 narrows and becomes tapered. That is, the distance between the front surface member 222 and the rear surface member 223 that constitute the reinforcing area gradually decreases toward an area other than the reinforcing area.

Then, above the structural branch line 226, the front surface member 222 and the rear surface member 223 are directly joined together without the honeycomb structure 224 interposed therebetween. In addition, in the example illustrated in FIG. 9, the honeycomb structure 224 is filled up to the tapered portion.

Figure 10:
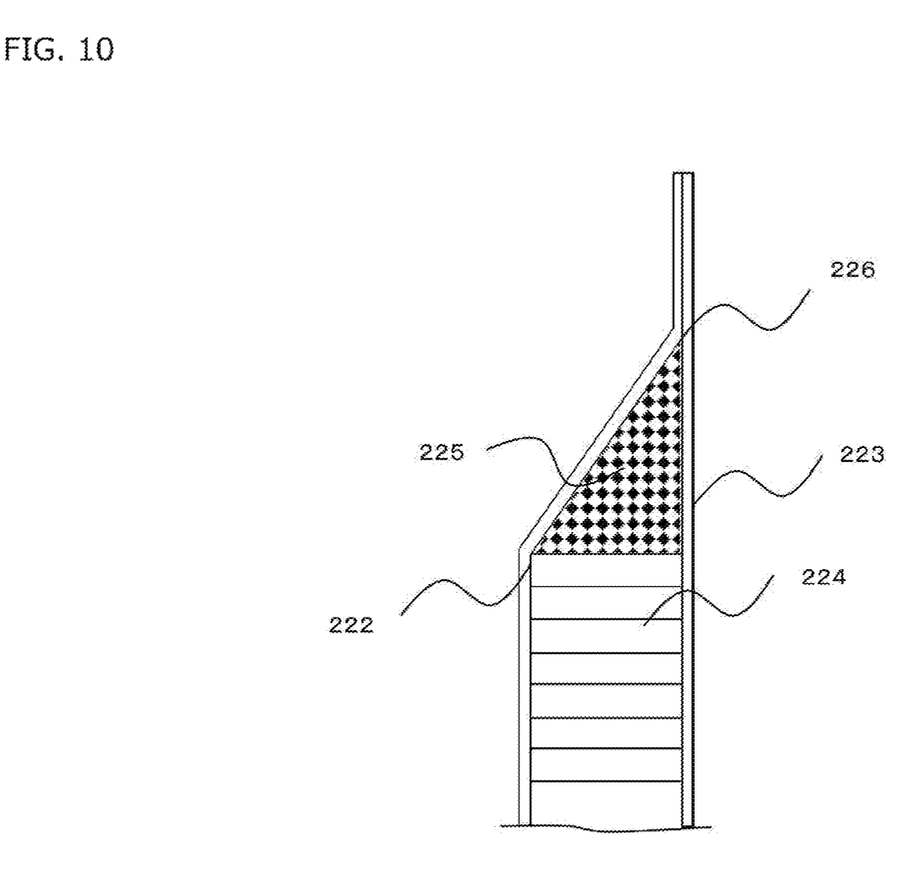
FIG. 10 is an enlarged cross-sectional view of a tapered portion of the shell structure according to the first embodiment (Modified Example 3).

FIG. 10 is a modified enlarged cross-sectional view of the tapered portion illustrated in FIG. 9. The difference from FIG. 9 is that the honeycomb structure 224 is not filled up to the tapered portion, but the tapered portion is filled with a sponge member 225 instead. That is, between the region where the honeycomb structure is provided between the front surface member and the rear surface member and the region where the front surface member and the rear surface member are directly joined, a region filled with a sponge member is provided between the front surface member and the rear surface member.

Accordingly, by filling the tapered portion with the sponge member 225, it is possible to facilitate the manufacture of the rear side shell 220.

(Operational Advantage)

According to the first embodiment, by providing a portion having a honeycomb structure between the front surface member and the rear surface member that constitute the shell below the rear side shell structure, in the entire upper shell, strong impacts can be absorbed in the lower portion, and in the upper portion, elastic displacement due to impacts can swiftly be returned to its original state. In this way, the strength of the aircraft against strong impacts from the longitudinal direction can be strengthened.

In particular, as illustrated in FIG. 5, even in the case that the front of the seat unit is facing diagonally with respect to the seat track, the lower portion of the rear side shell structure absorbs impacts from the direction of the seat track, that is the diagonal direction of the rear side shell structure, and the upper portion can quickly return elastic displacement due to diagonal impacts to its original state.

In addition, the right side shell 210 and the left side shell 230 also have a similar structure to the upper portion and the lower portion of the rear side shell 220, and as a result of the rear side shell being constituted by the rear side shell 220, the right side shell 210, and the left side shell 230 as a single unit, even in the case that the seat unit is more diagonally oriented with respect to the seat track, it is possible to increase its strength against impacts.

Second Embodiment

Figure 11:
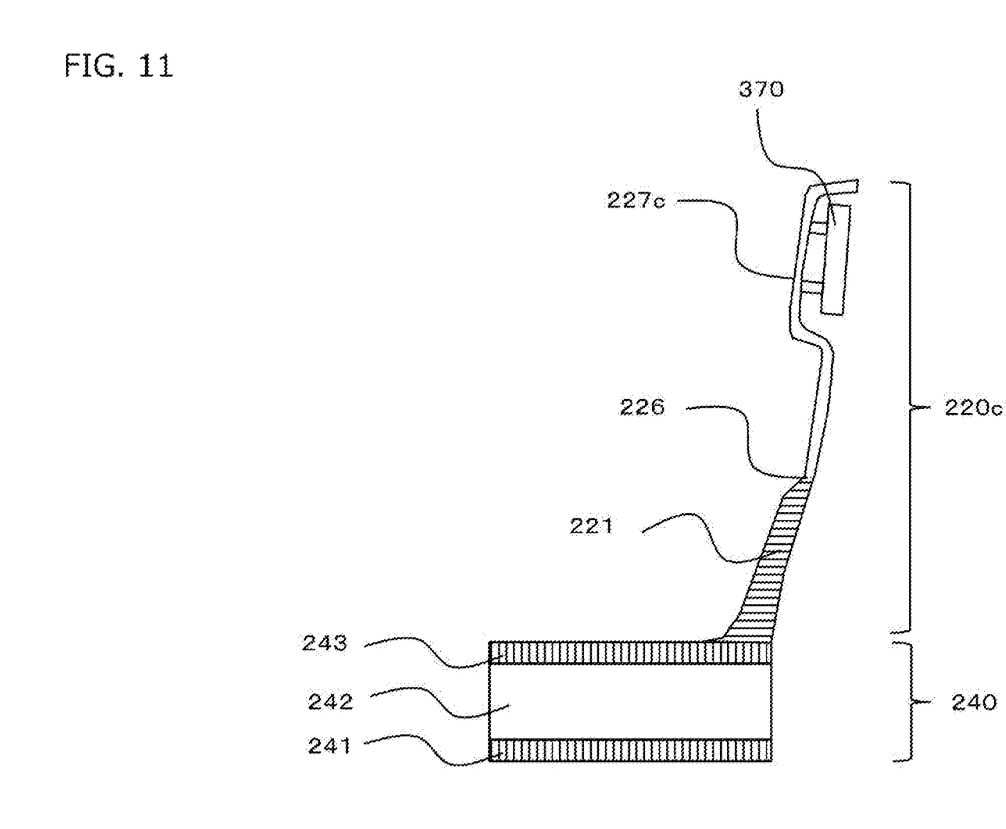
FIG. 11 is a cross-sectional view of a shell structure according to a second embodiment.

Next, a second embodiment will be described with reference to FIG. 11. FIG. 11 is a cross-sectional view of a shell structure according to a second embodiment. With the exception that a display 370 for the rear seat is disposed in the upper portion 227c of the rear side shell 220c, the configuration is the same as the first embodiment.
(Configuration)
In the second embodiment, the rear shell 220c is expanded in the forward direction in a partial region of the upper portion 227c of the rear side shell 220c, and a recess is provided in the rear. In addition, a display 370 is arranged in this recess.
(Operational Advantage)
According to the second embodiment, the installation space of the display 370 can be secured, and as a result the installation of the aircraft equipment can be simplified.

In addition, by attaching the display 370 to the rear side shell structure of the front seat in this way, the rear seat passenger can view the display at a fixed position since the rear side shell structure is not moved by the reclining operation. Put differently, the passenger in the rear seat does not notice whether the front seat is in the normal state or in the reclining state. That is, from the perspective of the front seat passenger, since their actions are covered and hidden by the rear side shell, these actions are not noticed by the rear passengers.

Further, as in the first embodiment, in the case of the second embodiment as well, by providing a portion having a honeycomb structure between the front surface member and the rear surface member that constitute the shell below the rear side shell structure, sufficient strength can be maintained even when the display is mounted on the rear side shell structure.

Third Embodiment

Figure 12:
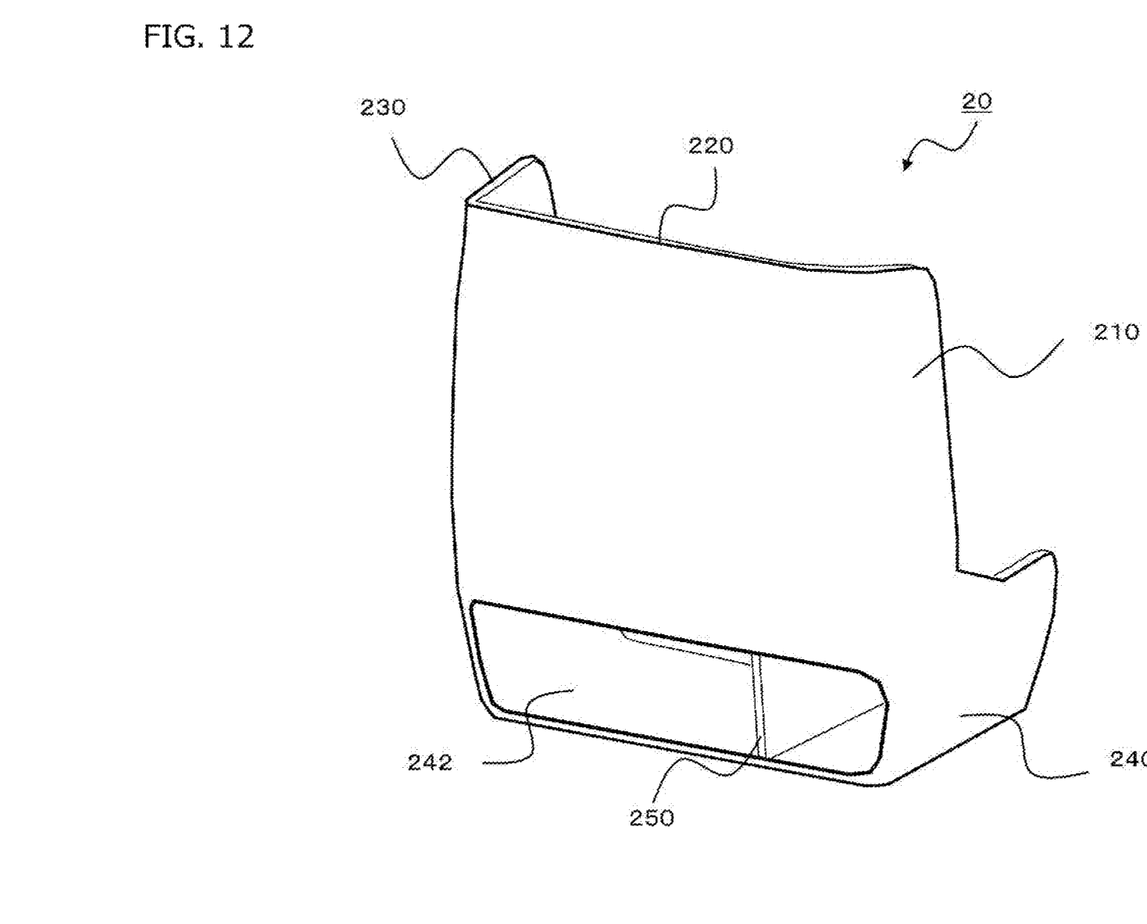
FIG. 12 is a rear perspective view of a shell structure according to a third embodiment.

Next, a third embodiment will be described with reference to FIG. 12. FIG. 12 illustrates a shell 20 that integrally molds the seat base 240 and the upper shell described in the first embodiment. Except for the fact that the seat base 240 and the upper shell are integrally molded together, the configuration is the same as the first embodiment.
(Configuration)
In the third embodiment, the seat base 240 and the upper shell are integrally molded together to realize an integrated monocoque structure. The composite materials and the like used for the integrally formed members are also the same as in the first embodiment.

It goes without saying that some of the modified examples of the first embodiment and the modified examples depicted in the second embodiment are also possible in the case the third embodiment as well.
(Operational Advantage)
According to the third embodiment, the same advantages as those of the first embodiment can be obtained, and further, since the seat base and the upper shell are integrated together, the strength of the entire seat can be increased, and the ease of assembly at the time of production can also be improved. In addition, an advantage of simplifying the mounting operation can also be obtained.

Fourth Embodiment

Figure 13:
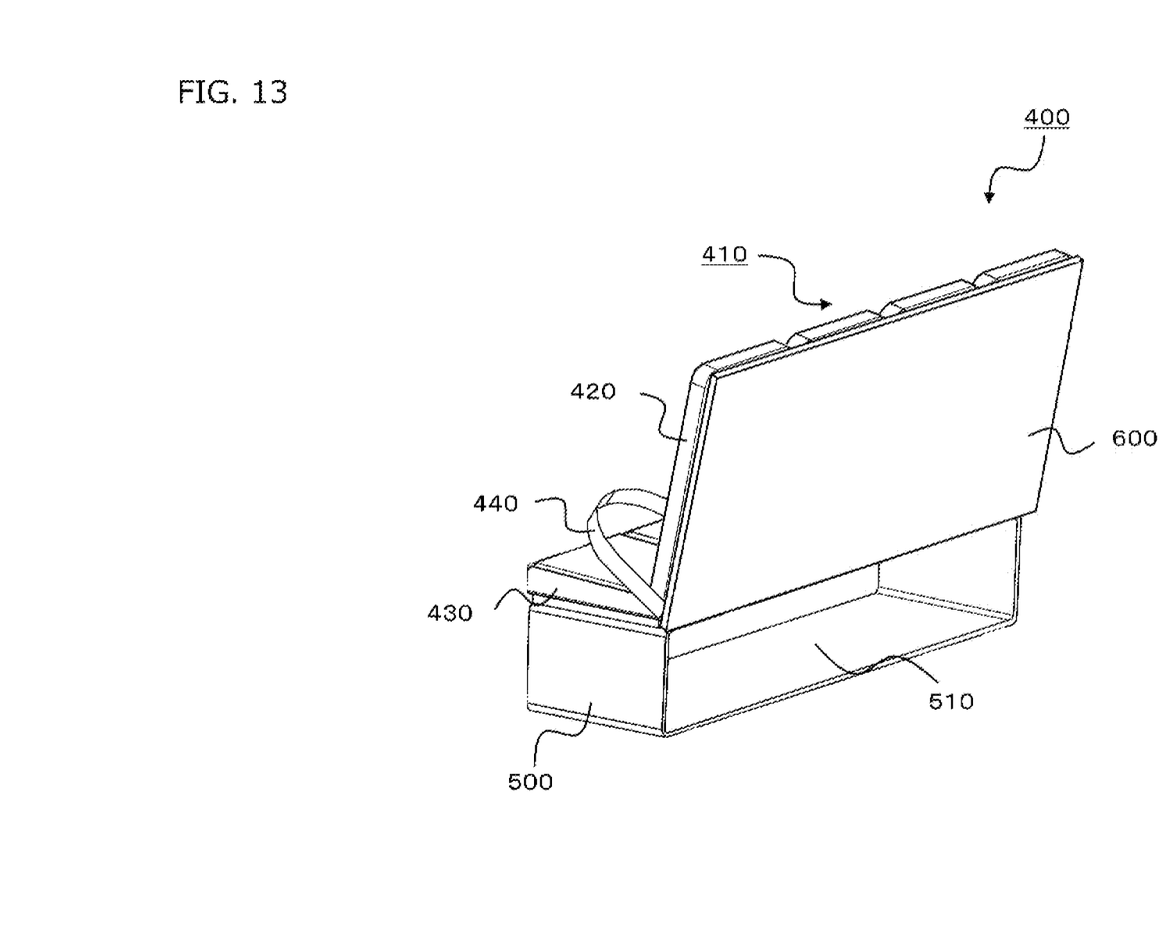
FIG. 13 is a rear perspective view of a seat unit according to a fourth embodiment.

FIG. 13 is a perspective view of the seat unit according to the third embodiment as viewed obliquely from the rear. The seat unit 400 may be used for the economy class disposed in the cabin of the aircraft.
(Configuration)
The seat unit 400 is constituted by a seat 410, a seat base 500 and a rear side shell 600. The seat 410 includes an upper seat 420, a lower seat 430, and a seat belt 440. The seat base 500 has an integrally formed hollow box-type seat lower structure as in the first embodiment.

The seat unit 400 includes a four person seat 410 and one seat base 500. That is, the hollow region 510 has one part.

The rear side shell 600 covers the entire rear part that serves as the back of the four person seat 410. The cross-sectional structure, the materials, and the like of the rear side shell 600 are the same as in the first embodiment.

In the case of the fourth embodiment as well, it goes without saying that some of the modified examples of the first embodiment and the modified examples depicted in the second embodiment are possible. Further, as in the case of the third embodiment, the rear side shell 600 and the seat base 500 may be integrally formed.
(Operational Advantage)
According to the fourth embodiment, the same advantages as those of the first embodiment can be obtained, and further, there is no need to divide the rear side space for each passenger, and the installation of the aircraft equipment can be simplified.

Although the present invention has been described in terms of an example applied to the above-described seat units of an aircraft, the subject of the present invention is not limited to aircraft, and may be also be applied to the seats of various mobile bodies other than aircraft, including various modifications. For example, the present invention can also be suitably used for other types of vehicles, such as trains, long-distance buses, and passenger ships, as well as water transport systems including ferries and hovercraft.

In addition, the above-described embodiments are described in detail in order to explain the present invention in an easy-to-understand manner, and are not necessarily limited to include all of the described configurations. Also, a portion of the configuration of one embodiment can be replaced with the configuration of another embodiment, and the configuration of one embodiment can be added to the configuration of another embodiment. Further, it is possible to add, delete, or replace a portion of one configuration with a portion of the configuration of another embodiment.

REFERENCE SIGNS LIST 1, 400 Seat unit
10, 410 Seat
20 Shell
110, 430 Lower seat
120, 420 Upper seat
130 Headrest
140 Legrest
150, 440 Seatbelt
160 Upper seat support structure
170 Reinforcing member
180 Seat reclining mechanism
190 Foot reclining mechanism
210 Right side shell
215 Shell boundary line
220, 600 Rear side shell 221 Lower portion
222 Front surface member
223 Rear surface member
224, 248 Honeycomb structure
225 Sponge member
226 Structural branch line
227 Upper portion
230 Left side shell
240, 500 Seat base
242, 510 Hollow region
241 Bottom
242, 510 Hollow region
243 Upper portion
250 Partition member
262 First mounting block
264 Second mounting block
266 Third mounting block
272 First fixture
274 Second fixture
276 Third fixture
282 First seat track
284 Second seat track
310 Right armrest portion
320 Left armrest portion
330 Storage box
340 Ottoman
350 Jack
360 Reading light
370 Display

The invention claimed is:

1. A rear side shell structure for covering a back of a seat, the rear side shell structure comprising:
a front surface member; and
a rear surface member,
wherein
a reinforcing region in which a space reinforcing member is provided between the front surface member and the rear surface member is provided in a portion of the rear side shell structure,
the front surface member and the rear surface member are directly joined to each other except for in the reinforcing region, and
in a vicinity where the reinforcing region is in contact with a region other than the reinforcing region, a distance between the front surface member and the rear surface member that constitute the reinforcing region gradually decreases toward the region other than the reinforcing region.

2. The rear side shell structure according to claim 1, wherein the front surface member and the rear surface member are formed of composite members.

3. The rear side shell structure according to claim 1, wherein the space reinforcing member has a honeycomb structure.

4. The rear side shell structure according to claim 1, wherein the rear side shell structure is integrally formed with a lower structure connected and fixed to a mobile body.

5. The rear side shell structure according to claim 2, wherein the rear side shell structure is integrally formed with a lower structure connected and fixed to a mobile body.

6. The rear side shell structure according to claim 3, wherein the rear side shell structure is integrally formed with a lower structure connected and fixed to a mobile body.

7. The rear side shell structure according to claim 1, wherein the rear side shell structure is integrally formed with a right side shell and a left side shell of the seat.

8. The rear side shell structure according to claim 2, wherein the rear side shell structure is integrally formed with a right side shell and a left side shell of the seat.

9. The rear side shell structure according to claim 3, wherein the rear side shell structure is integrally formed with a right side shell and a left side shell of the seat.

10. The rear side shell structure according to claim 1, wherein the rear side shell structure covers a back of a seat for a plurality of people.

11. The rear side shell structure according to claim 2, wherein the rear side shell structure covers a back of a seat for a plurality of people.

12. The rear side shell structure according to claim 3, wherein the rear side shell structure covers a back of a seat for a plurality of people.

13. The rear side shell structure according to claim 1, wherein a recess for disposing a display for a rear seat is formed in the rear surface member.

14. The rear side shell structure according to claim 2, wherein a recess for disposing a display for a rear seat is formed in the rear surface member.

15. The rear side shell structure according to claim 3, wherein a recess for disposing a display for a rear seat is formed in the rear surface member.

16. A seat unit comprising:
a seat;
a rear side shell structure; and
a lower structure connected and fixed to a mobile body, wherein:
the rear side shell structure includes:
a front surface member; and
a rear surface member, and
a reinforcing region in which a space reinforcing member is provided between the front surface member and the rear surface member is provided in a portion of the rear side shell structure,
the front surface member and the rear surface member are directly joined to each other except for in the reinforcing region, and
in a vicinity where the reinforcing region is in contact with a region other than the reinforcing region, a distance between the front surface member and the rear surface member that constitute the reinforcing region gradually decreases toward the region other than the reinforcing region.

* * * * *